United States Patent
Inoue et al.

(10) Patent No.: US 11,912,295 B2
(45) Date of Patent: Feb. 27, 2024

(54) TRAVEL INFORMATION PROCESSING APPARATUS AND PROCESSING METHOD

(71) Applicant: Nissan Motor Co., Ltd., Kanagawa (JP)

(72) Inventors: Hirofumi Inoue, Kanagawa (JP); Jo Nishiyama, Kanagawa (JP); Takehito Teraguchi, Kanagawa (JP); Yu Shikoda, Kanagawa (JP); Shota Okubo, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 643 days.

(21) Appl. No.: 17/253,849

(22) PCT Filed: Jun. 19, 2018

(86) PCT No.: PCT/JP2018/023274
§ 371 (c)(1),
(2) Date: Dec. 18, 2020

(87) PCT Pub. No.: WO2019/244239
PCT Pub. Date: Dec. 26, 2019

(65) Prior Publication Data
US 2021/0261146 A1  Aug. 26, 2021

(51) Int. Cl.
*B60W 50/10* (2012.01)
*B60R 16/037* (2006.01)
(Continued)

(52) U.S. Cl.
CPC ......... *B60W 50/10* (2013.01); *B60R 16/0373* (2013.01); *G06T 11/00* (2013.01); *G06V 20/56* (2022.01); *G10L 15/08* (2013.01); *G10L 15/22* (2013.01); *B60W 2420/42* (2013.01); *B60W 2540/21* (2020.02); *B60W 2540/215* (2020.02);
(Continued)

(58) Field of Classification Search
None
See application file for complete search history.

(56) References Cited

U.S. PATENT DOCUMENTS 10,598,504 B2 * 3/2020 Oh .................... G01C 21/3608
2014/0136013 A1 * 5/2014 Wolverton ............ B60K 37/06
701/1

(Continued)

FOREIGN PATENT DOCUMENTS

JP  2017-30572 A  2/2017
JP  2017-54064 A  3/2017
(Continued)

*Primary Examiner* — Tamara L Weber
(74) *Attorney, Agent, or Firm* — Osha Bergman Watanabe & Burton LLP (57) ABSTRACT

A travel information processing apparatus includes a voice input device configured to input voice data of a user, an output device configured to specify an object by estimating from the voice data based on a word extracted from the voice data and indicating the object around a traveling route and a word extracted from the voice data and indicating a positional relationship of the object and output image data or voice data indicating a specified object; and a travel information processor configured to change a traveling motion of a subject vehicle based on the specified object.

10 Claims, 8 Drawing Sheets

(51) Int. Cl.
*G06T 11/00* (2006.01)
*G10L 15/08* (2006.01)
*G10L 15/22* (2006.01)
*G06V 20/56* (2022.01)

(52) U.S. Cl.
CPC .. *G10L 2015/088* (2013.01); *G10L 2015/223* (2013.01)

(56) References Cited

U.S. PATENT DOCUMENTS

| | | | |
|---|---|---|---|
| 2014/0365228 A1 | 12/2014 | Ng-Thow-Hing et al. | |
| 2017/0168774 A1 | 6/2017 | Sugita et al. | |
| 2017/0210394 A1 | 7/2017 | Yamada et al. | |
| 2017/0278305 A1 | 9/2017 | Sisbot | |
| 2018/0164817 A1 | 6/2018 | Herz et al. | |
| 2018/0194367 A1 | 7/2018 | Yamada et al. | |
| 2018/0336007 A1* | 11/2018 | Li | G10L 15/22 |
| 2019/0064808 A1* | 2/2019 | Dyer | B60W 30/00 |

FOREIGN PATENT DOCUMENTS

| | | |
|---|---|---|
| JP | 2017-136968 A | 8/2017 |
| JP | 2017-175621 A | 9/2017 |
| JP | 2018-13915 A | 1/2018 |
| WO | 2016/002406 A1 | 1/2016 |
| WO | 2017/145364 A1 | 8/2017 |

* cited by examiner

FIG.1

| | category | keyword |
|---|---|---|
| Action=Traveling Motion | turning left/right | Turn left |
| | stopping | Stop |
| | refueling/charging | Refuel/Charge |
| | lane change | Move to the right lane. |
| | road change | Get on the expressway |
| | relative control to the other vehicle | Overtake/Track |
| Position of Object | distance from the subject vehicle | 100m ahead |
| | order in a traveling direction | Next/Second |
| | relative position to the subject vehicle | Front/Rear/Left/Right |
| Modifier of Object | color | Red/Blue |
| | shape | Round/Square |
| | size | Large/Small |
| Object | signal | Signal |
| | intersection | Intersection |
| | point on a map (POI) | Building/Convenience Store/GS |

TRAVEL INFORMATION PROCESSING APPARATUS AND PROCESSING METHOD

TECHNICAL FIELD

The present invention relates to a travel information processing apparatus and processing method.

BACKGROUND ART

It is known a driving support apparatus configured to output an image including a vehicle object representing the subject vehicle and a plurality of lanes on a display; and output a command for changing the driving lane of the subject vehicle from the first lane to the second lane to an autonomous driving controller when an operation of a user for moving the vehicle object in the image displayed on the display from the first lane to the second lane is accepted, thereby a driver intuitively and simply could instruct a vehicle to perform a specific driving operation (Patent Document 1).

PRIOR ART DOCUMENT

[Patent Document]
[Patent Document 1] JP2017-030572A

SUMMARY OF INVENTION

Problem to be Solved by Invention

However, there are problems that the position not displayed on the display cannot be specified, although a change of a position of the subject vehicle can be specified, and traveling route indicating turning right or left or stopping for example, other than the change of a position of the subject vehicle, cannot be specified, when commands are inputted by touching the display as in the above-mentioned conventional technique.

A problem to be solved by the present invention is to provide a travel information processing apparatus and a processing method by which a user can intuitively and easily instruct a vehicle to perform a particular driving operation.

Means for Solving Problems

The present invention solves the above problem by inputting a voice data of a user, specifying an object by estimating from the voice data based on a word estimated from the voice data and indicating the object around a traveling route and a word extracted from the voice data and indicating a positional relationship of the object, outputting image data or voice data indicating a specified object, and changing traveling route of the subject vehicle based on the image data or the voice data.

Effect of Invention

According to the present invention, by specifying an object estimated from voice data and outputting image data or voice data indicating the specified object, the user can confirm the consistency or correctness with the object intended by the user by viewing the output image data or voice data. Therefore, a travel information processing apparatus and a processing method by which a user can intuitively and easily instruct a vehicle to perform a particular driving operation are provided.

MODE(S) FOR CARRYING OUT THE INVENTION

Figure 1:
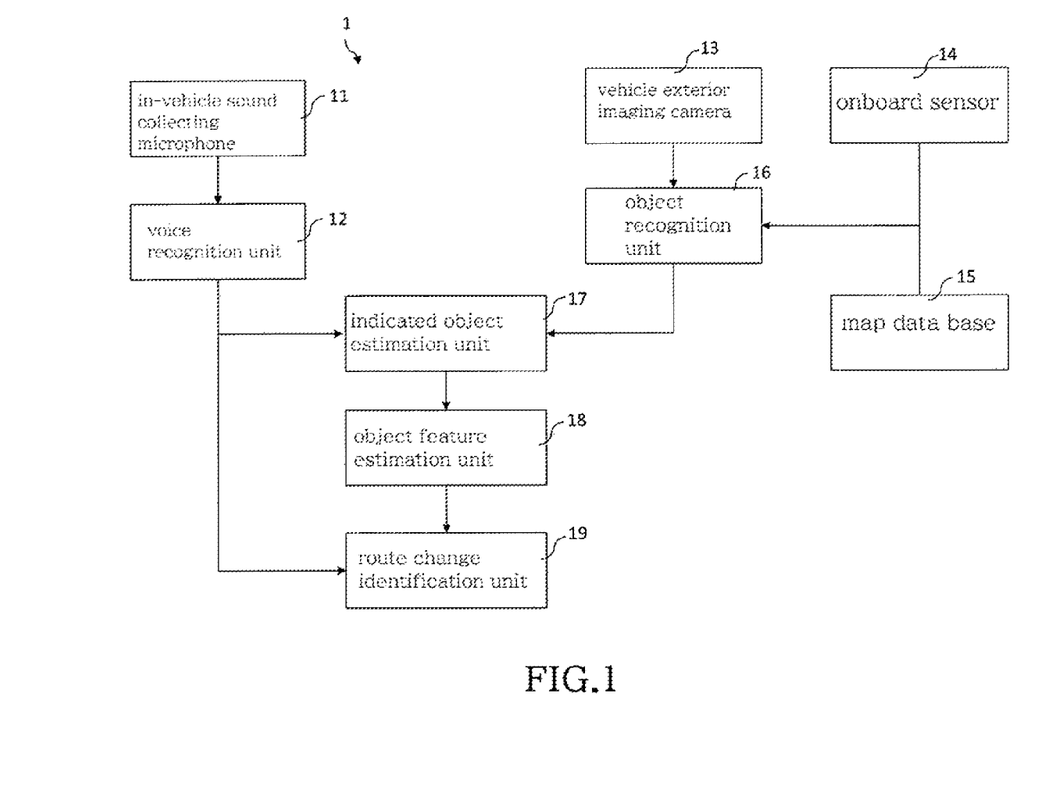
FIG. 1 is a block diagram showing an embodiment of a travel information processing apparatus according to the present invention.

Embodiments of the present invention will be described below with reference to the drawings. FIG. 1 is a block diagram showing an embodiment of a travel information processing apparatus 1 according to the present invention. Travel information processing apparatus 1 of the present invention embodiment also uses the travel information processing method according to the present embodiment. Travel information processing apparatus 1 of the present embodiment inputs a destination in advance to an in-vehicle navigational device or the like, inputs a voice data of a user such as a passenger on the assumption that the vehicle is traveling in a traveling route set by the destination, specifies an object estimated from voice data based on the word indicating the object around the traveling route and the word indicating the positional relation of the object extracted from voice data, outputs image data or voice data indicating the specified object, and changes the traveling route of the vehicle based on image data or voice data.

Therefore, the travel information processing apparatus 1 of the present embodiment, as shown in FIG. 1, comprises an onboard sound collection microphone 11, a voice recognition unit 12, a vehicle exterior imaging camera 13, an onboard sensor 14, a map database 15, an object recognition unit 16, an indicated object estimation unit 17, an object feature estimation unit 18 and a route change identification unit 19.

The in-vehicle sound collecting microphone 11 collects sound emitted by a user, such as a driver or a passenger as a navigator, and outputs voice data to the sound recognizing unit 12. The in-vehicle sound collecting microphone 11 is installed at a position where the voice of the user in the vehicle cabin can be easily input. One or more microphones may be provided at appropriate locations, such as the top surface of the steering column cover or the instrument panel if they are at the driver seat, the instrument panel if they are at the passenger seat, or the rear or front seat of the console box if they are at the rear seat.

Figure 2:
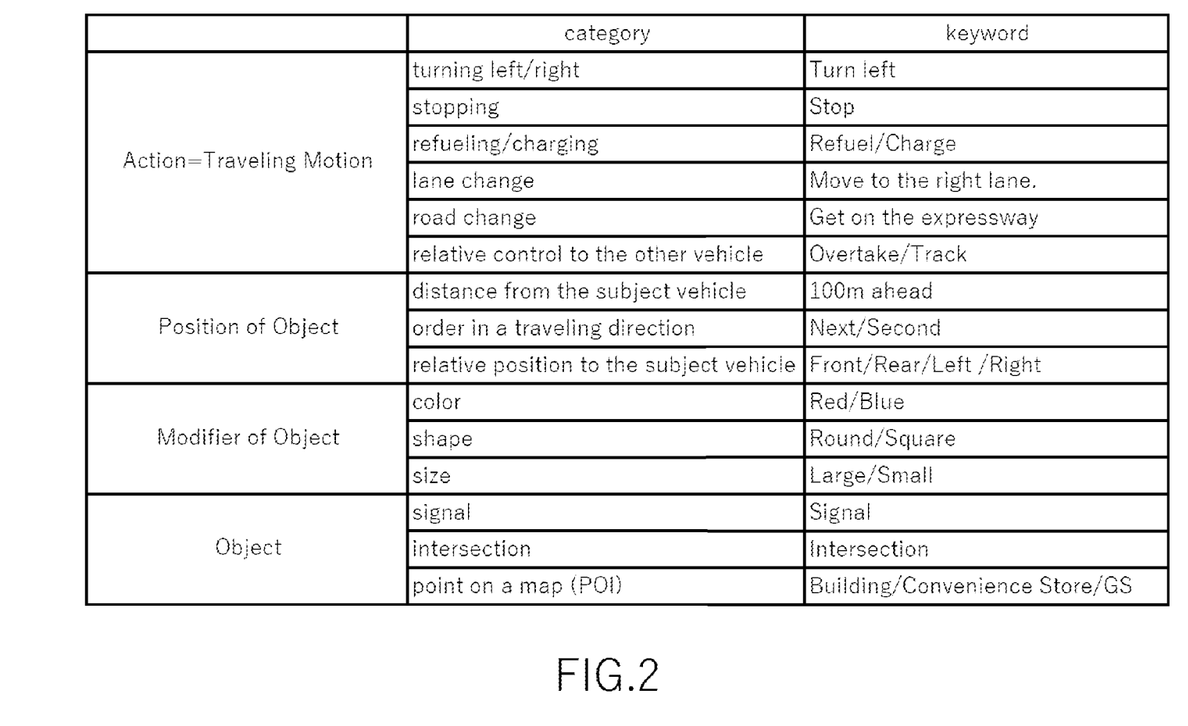
FIG. 2 is examples of recognition keywords used in the voice recognition unit 12 of FIG. 1.

The voice recognition unit 12 performs a voice recognition process using a known method such as a statistical method from voice data inputted to the in-vehicle sound collection microphone 11, extracts a word indicating objects around traveling route and a word indicating positional relationship of the object from the recognized languages (character string data), and outputs the extracted words to the indicated object estimation unit 17. FIG. 2 is an example of a recognition keyword used in the voice recognition unit 12. Here, the objects surrounding the traveling route are vehicles, motorcycles, bicycles, pedestrians, as well as traffic lights, intersections, pedestrian crossings, street trees, convenience stores, gas stations, buildings and other stores and buildings (points POI on maps=Points of Interest) and signboards that are often around roads and used to describe routes. Further, the word indicating the positional relationship of the object is a word indicating the specific position, the superordinate conceptual position, the relative position, and the order in the specific direction of the object, and refers to a distance from the vehicle, such as "100 m ahead" which is often used for explanation of a route, an order in a traveling direction, such as "next second signal", and a superordinate conceptual or relative position, such as "front, rear, right, left of the vehicle".

Incidentally, the recognition keywords shown in FIG. 2 include a word indicating the motion of the vehicle (i.e., the travel control of the vehicle) and a word indicating the modifiers of the objects in addition to the above-mentioned word indicating the objects around traveling route and the word indicating the positional relationship of the object, and the languages (character string data) recognized by the voice recognition unit 12 are outputted to the route change identification unit 19. The word indicating the motion of the vehicle refer to a word relating to driving control, particularly steering operation, such as "turn left", "stop", "refuel/charge", "move to the right lane", "get on the expressway", "overtake" and "track", and this word indicating the motion of the vehicle is extracted from voice data. The modifier of an object is a word indicating a color, a shape, a size, specification, or the like of a specific object, and can be exemplified by "a red car", "a round building", "a large intersection", "a taxi", "a one-box car", or the like. The word (character string data) indicating the motion of the subject vehicle and the language (character string data) related to the modifier of an object are used in the route change identification unit 19.

The vehicle exterior imaging camera 13 is a camera that captures a field of view around the subject vehicle viewed by the driver or the passenger, and for example, it may be installed in the vicinity of the interior mirror in the case of a camera that captures the front field of the view, installed in the upper part of the rear window in the room in the case of a camera that captures the rear field of the view, or installed at a door mirror in the case of a camera that captures the side field of the view, or the like. Image data captured by the vehicle exterior imaging camera 13 is outputted to the object recognition unit 16.

The onboard sensor 14 includes a sensor capable of recognizing a distance to an object, such as a laser or a radar sensor stereo camera mounted on an automatic driving vehicle or the like. Distance to a specific object detected by the onboard sensor 14 is output to the object recognition unit 16. The map database 15 is a storage device that stores map data, and the map data stored in the map database 15 is output to the object recognition unit 16.

The object recognition unit 16 executes a recognition process of a specific object based on image data imaged by the vehicle exterior imaging cameras 13, a distance to a specific object detected by the onboard sensors 14, and map data stored in the map database 15. That is, the object recognition unit 16 uses known techniques such as deep neural network DNNs that utilize deep learning methods to recognize a variety of objects, such as vehicles, bikes, bicycles, pedestrians, signal machines, intersections, crossroads, street trees, convenience stores, gasoline stands, buildings including shops, structures and their signs, etc., which exist around roads and are commonly used to explain routes, and to extract feature quantities (such as a color, a size, a distance, a vehicle model, a vehicle type, etc.) in each recognized area.

The indicated object estimation unit 17 estimates an object intended by the user through speech, and outputs the estimation to the object feature estimation unit 18. That is, the indicated object estimating unit 17 estimates an object intended by the user through speech from the language (character string data) recognized by the voice recognizing unit 12 and the object or the feature quantity thereof recognized by the object recognizing unit 16, and outputs the object data to the object feature estimation unit 18. For example, when the word indicating the object around traveling route extracted by the voice recognition unit 12 and the word indicating the positional relation of the object are "the taxi 100 m ahead", the indicated object estimation unit 17 recognizes "the taxi" "100 m ahead" from image data among the objects recognized by the object recognition unit 16. This "100 m ahead" is recognized by use of the onboard sensor 14, and since a taxi has a green license plate and a sign light (so-called a lamp) is mounted on a roof of a taxi, feature quantities such as a color or a vehicle type are used for recognition of "the taxi".

In order to confirm whether or not the object estimated by the indicated object estimation unit 17 is an object intended by the user through speech, the object feature estimation unit 18 selects feature quantities that differs from the feature specified by the user's voice data or a detailed feature, and outputs the feature to the route change identification unit 19. For example, when a word indicating an object around a traveling route extracted by the voice recognition unit 12 and a word indicating a positional relation of the object, that is, features of the object specified by the user's voice data are "the taxi 100 m ahead", a more detailed or different feature quantity is selected as "it is the white Nissan FUGA taxi, isn't it?" instead of selecting and repeating the feature quantity as "it is the taxi 100 m ahead, isn't it?" as repeating like a parrot.

The route change identification unit 19 causes the user to confirm whether or not the change position of the route intended by the user is correct by using the feature quantities selected by the object feature estimation unit 18, and if it is correct, changes the currently set traveling route to the traveling route. The route change identification unit 19 presents the feature quantity selected by the object feature estimation unit 18 to the user as image data or voice data. Therefore, the route change identification unit 19 includes a display for displaying image data or a speaker for outputting voice data. When image data is displayed on the display or when voice data is output from the speaker, steering operation information regarding steering operation of the vehicle extracted by the voice recognition unit 12 is also output together with the image data information or the voice data information. When image data is displayed on the display, the route change identification unit 19 may display image data including road information around the subject vehicle and an icon indicating steering operation, the icon being superimposed on the road information. When image data is displayed on the display, the route change identification unit 19 may display image data in which a position of a specified object is marked with respect to road information around the subject vehicle.

Figure 3:
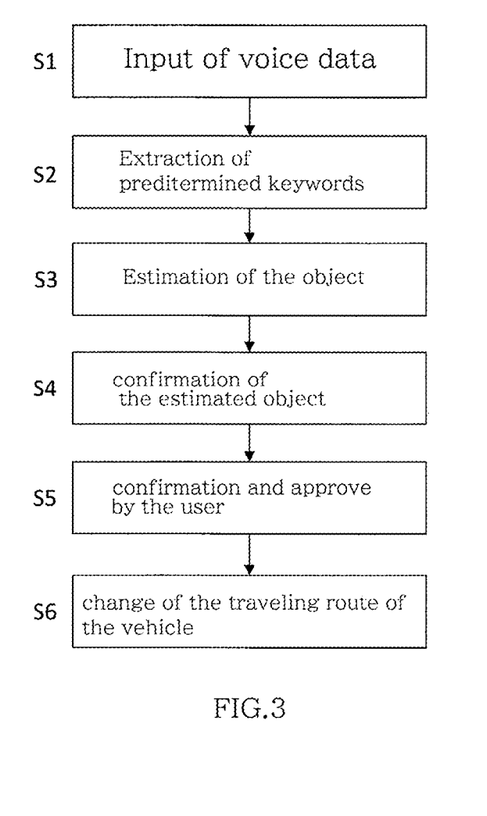
FIG. 3 is a flow chart showing the basic process sequence of travel information processing apparatus of FIG. 1.

Next, basic process procedures of travel information processing apparatus 1 of the present embodiment will be described. FIG. 3 is a flow chart showing a basic process sequence of travel information processing apparatus 1 according to the present embodiment. In step S1, travel information processing apparatus 1 of the present embodiment inputs voice data of the user from the in-vehicle sound collecting microphone 11. Next, in step S2, predetermined keywords shown in FIG. 2 are extracted by the voice recognition unit 12. Next, in step S3, the object recognition unit 16 recognizes an object by using the detection data from the vehicle exterior imaging camera 13, the onboard sensor 14, and the map database 15, and the indicated object estimation unit 17 estimates the object from the recognized object and a language (character string data) extracted by the voice recognition unit. Next, in S4, the object feature estimation unit 18 selects feature quantities and the route change identification unit 19 presents the feature quantities to the user by image data or voice data to confirm the estimated object. Next, in S5, the route change identification unit 19 causes the user to confirm and approve the feature quantities presented to the user by image data or voice data. Finally, in S6, if the user confirms that the presented image data or voice data is correct, the currently set traveling route is changed.

Figure 4:
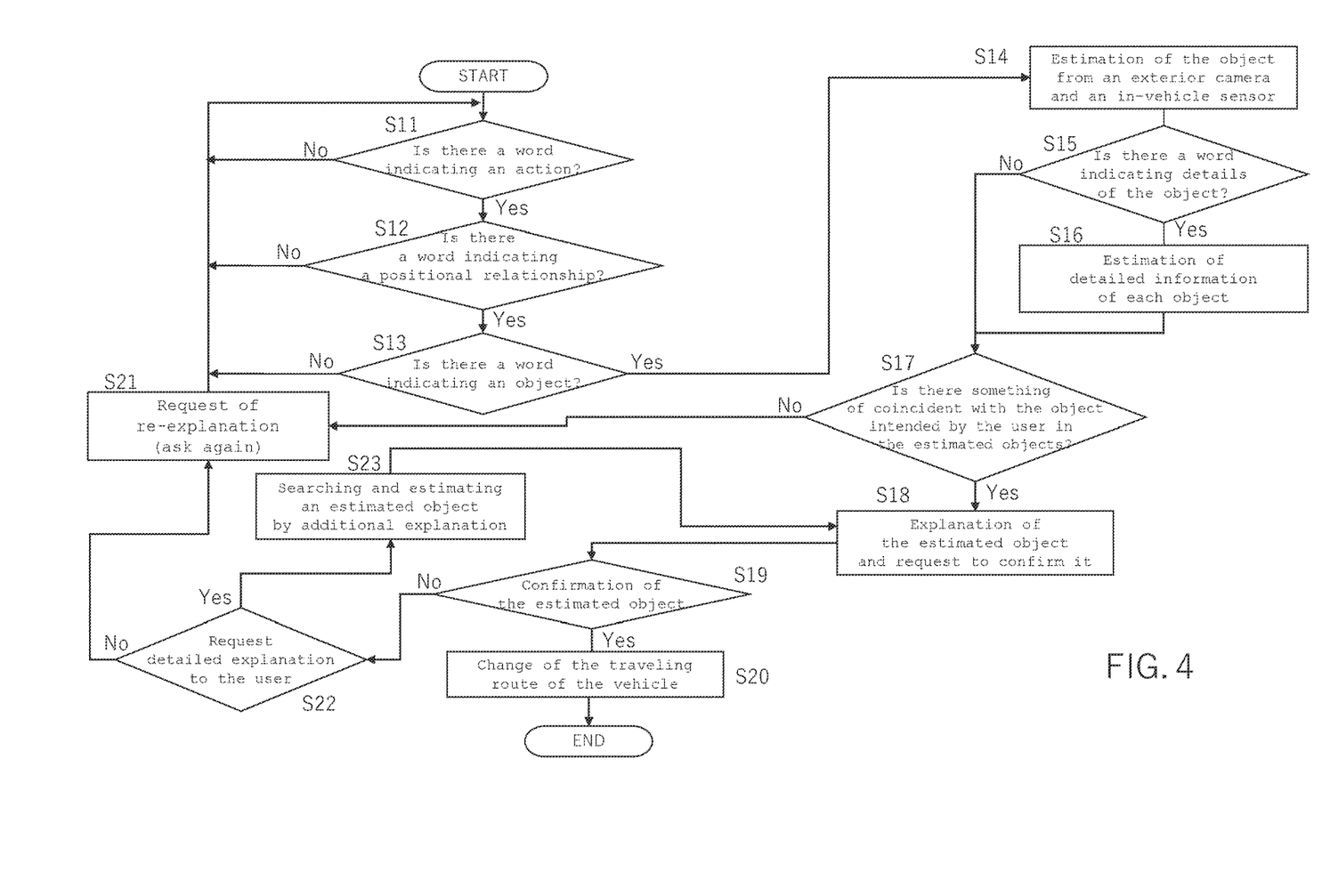
FIG. 4 is a flow chart showing a specific process sequence of travel information processing apparatus of FIG. 1.

FIG. 4 is a flow chart showing a more specific process sequence of travel information processing apparatus 1 according to the present embodiment. It is assumed that this processing is repeatedly executed at predetermined time intervals, and that a destination is inputted to a navigation device of the vehicle and a traveling route to the destination is set as a premise for starting this processing. In this case, the operation may be a manual operation or may be an automatic operation for automatically controlling acceleration and deceleration control and/or steering control. First, it is assumed that voice of the user such as a driver or a passenger is constantly inputted to the in-vehicle sound collecting microphone 11 prior to steps S11 to S13, and the voice recognition unit 12 constantly executes the recognition process of the voice data. Travel information processing apparatus 1 of the present embodiment is an example in which a speaker or the like is used to present something to the user or get answers through voice data.

In steps S11 to S13, it is determined whether or not the language (character string data) recognized by the voice recognition unit 12 has the language indicating the action (travel control) shown in FIG. 2 (step S11), the language indicating the positional relationship of the object (step S12), and the language indicating the object (step S13). If each of the language indicating the action, the language indicating the positional relationship of the object, and the language indicating the object exists, the process proceeds to step S14, and estimation of the object intended by the user is started. On the other hand, if any one of the language indicating the action, the language indicating the positional relationship of the object, and the language indicating the object does not exist, the process returns to step S11. Note that step S11 may be omitted and only steps S12 and S13 may be executed.

In parallel with the processing of steps S11 to S13, in step S14, the vehicle exterior imaging camera 13, the onboard sensor 14, and the map database 15 are used so that the object recognizing unit 16 constantly recognizes the object around the vehicle based on image data, distance and position. In step S15, it is determined whether or not a language indicating details of the object exists in the language recognized by the voice recognition unit 12. If the language indicating the details of the object exists in step S15, the process proceeds to step S16, and the detailed information of each object recognized in step S14 is estimated. If the language indicating the details of the object does not exist in step S15, the process proceeds to step S17 without estimating the detailed information. The object recognized in step S14 or S16 is an object existing around the vehicle and is a candidate of an object intended by the user.

In step S17, the indicated object estimation unit 17 compares the language indicating the action recognized in steps S11 to S13, the language indicating the positional relationship of the object, and the language indicating the object, that is, the object intended by the user through the voice, with the object recognized in steps S14 to S16, and determines whether or not there is something to coincident. In this case, a predetermined threshold value is set as the degree of coincidence, and similar objects may be included. This is because, for example, a color, a shape, a positional relationship, and the like of the object are languages that are generated as a result of being recognized by the subjective view of the user. This is also because, for example, "a red vehicle" indicates different red colors with different lightness. Furthermore, due to performance of the vehicle exterior imaging camera 13 or the like, image to be captured may be captured as a shape or a color that is different from the actual object. In step S17, if there is an object coincident with the object recognized by the voice recognition unit 12 in the objects recognized by the object recognition unit 16, the process proceeds to step S18, and if there is no coincident object, the process proceeds to step S21. In step S21, the indicated object estimation unit 17 requests the user to re-explain as "please explain again" through the speaker because it is determined that there is no object coincident with the object recognized by the voice recognition unit 12 among the objects recognized by the object recognition unit 16.

In step S17, when there is an object coincident with the object recognized by the voice recognition unit 12 among the objects recognized by the object recognition unit 16, the process proceeds to step S18. In step S18, the object feature estimation unit 18 explains the estimated object to the user through the speaker in order to have the user confirm whether or not the position and the action of the estimated object are correct. Contents of explanation by the object feature estimation unit 18 is explained by using, for example, a color, a size, a vehicle type, a vehicle category, and written characters of the object not to be mere repeat of speech of the user.

(1) For example, when voice of the user saying, "please stop behind the red car" is recognized, it is noticed "this vehicle will stop behind the red pickup truck". In this case, the object feature estimation unit 18 specifies the red vehicle by image recognition, explains the object and notifies the user by using the result of recognizing that the red vehicle is a pickup truck.

(2) In addition, a positional relationship of an object included in voice of the user may be specified by an object or a place recognized by the object feature estimation unit 18 and not included in voice of the user, so that the object may be notified so as to be described in more detail. For example, when voice of the user saying, "please stop behind the red car" is recognized, it is notified "this vehicle will stop behind the red pickup truck beyond the next intersection". In this case, as a result of the object feature estimation unit 18 recognizing the red vehicle by image recognition and recognizing that there is an intersection between the further identified red vehicle and the subject vehicle, the intersection point is identified as another object for explaining the relative positional relationship of the object included in the voice, and notifies the user of the information including the contents explaining that there is a red vehicle ahead of the identified intersection.

(3) The explanation may also describe positions for acting and actions by using another object that is different from the object identified by the user's voice. For example, if the user's voice saying "please stop behind a red car" is recognized, the user is notified "the vehicle will stop in front of the next gas station". In this case, the object feature estimation unit 18 specifies a red car by image recognition, and uses the result of recognizing that the red car is stopped in front of the gasoline station to specify the gasoline station which is a more conspicuous building by image recognition instead of using the red car which is an object specified by the user and use the gasoline station as a language explaining the position for acting.

(4) Further, in the case an object such as a point POI on a map is used, on the basis of the map information, the brand information (company name, etc.) of the convenience store may be used for voice data with the "convenience store" of the user, or the attribute information such as the name of the store or "the cake shop" may be used from the map information for voice data with the "corner store". For example, when the user's voice "please stop at the next convenience store" is recognized, the closest convenience store located in the direction of travel and the name of the store are specified from the map information, and the notification "this vehicle will stop at the next AA store (store name)" is made.

In step S19, the user answers whether or not the explained estimated object is an object intended by the user via the route change identification unit 19. Specifically, when the estimated object is explained through the speaker, the answer "Yes" or "No" is given by voice. In step S19, if the estimated object is the object intended by the user, the process proceeds to step S20, and the route change identification unit 19 changes a traveling route set preliminarily to a traveling route based on the action intended by the user (travel control) in step S20. For example, when the user says "turn left the road in front of the taxi 100 m ahead", the traveling route is changed to the traveling route for tuning left the road in front of the taxi 100 m ahead, although the preliminarily set traveling route is straight ahead.

In step S19, when the estimated object is not the object intended by the user, the process proceeds to step S22, and the route change identification unit 19 requests the user for a re-explanation or an additional explanation such as "please explain again in detail" through the speaker. If the user doesn't re-explain or explain additionally, the process proceeds to step S21, and if the user re-explains or explains additionally, the process proceeds to step S23. In step S23, the speech recognizing unit 12 recognizes the user's re-explanation or additional voice data and estimates the object again based on the extracted characteristic quantity of the object, and it is explained to the user through the speaker, and the process returns to step S18. The processes after step S18 are as described above.

Figure 5:
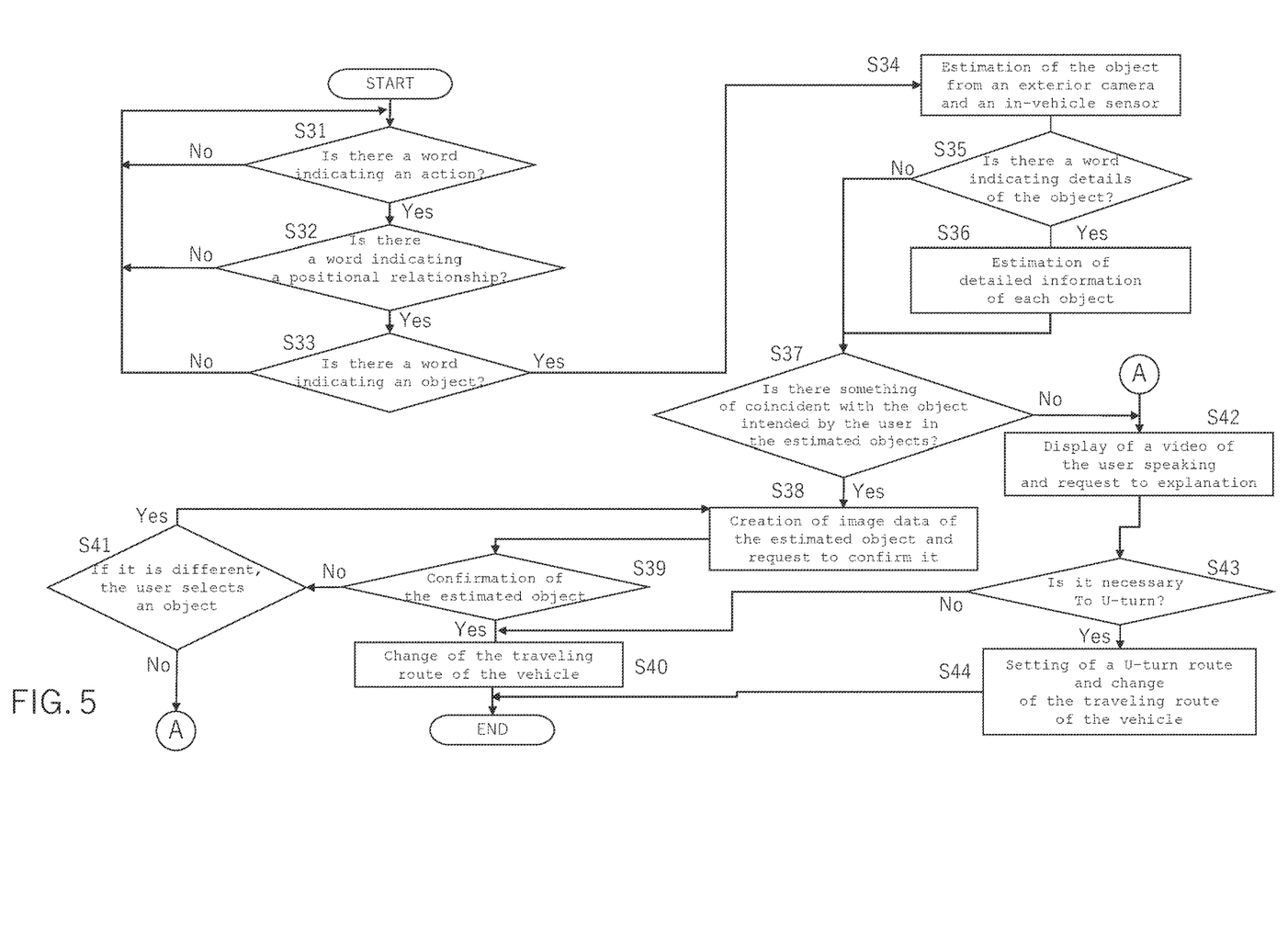
FIG. 5 is a flow chart showing another specific process of travel information processing apparatus of FIG. 1.
Figure 6:
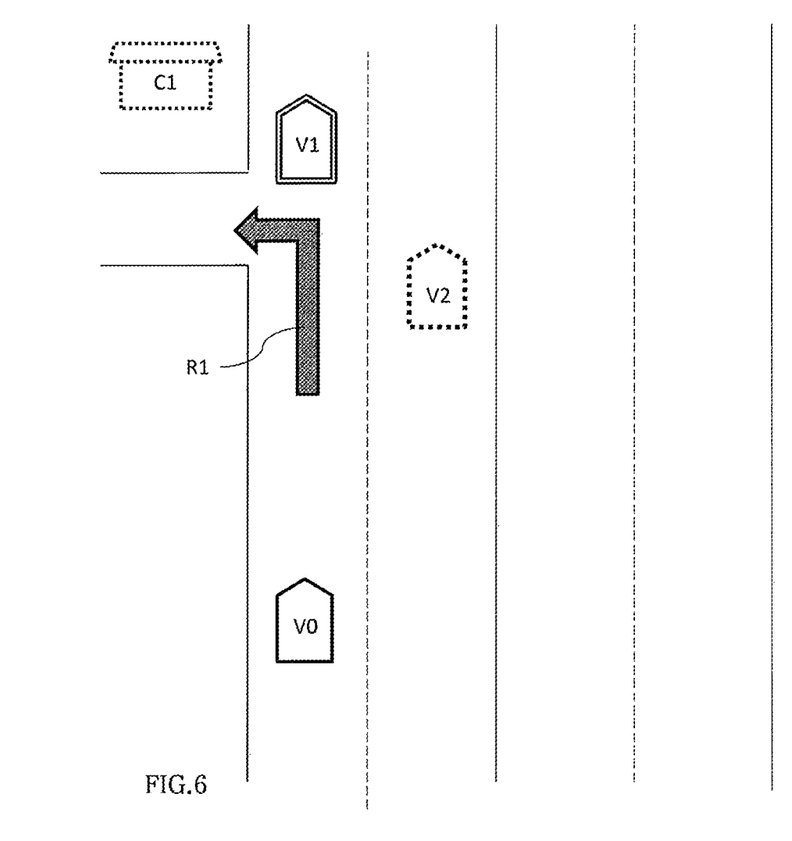
FIG. 6 is a diagram showing an example of image data displayed on the display in the process of FIG. 5.
Figure 7:
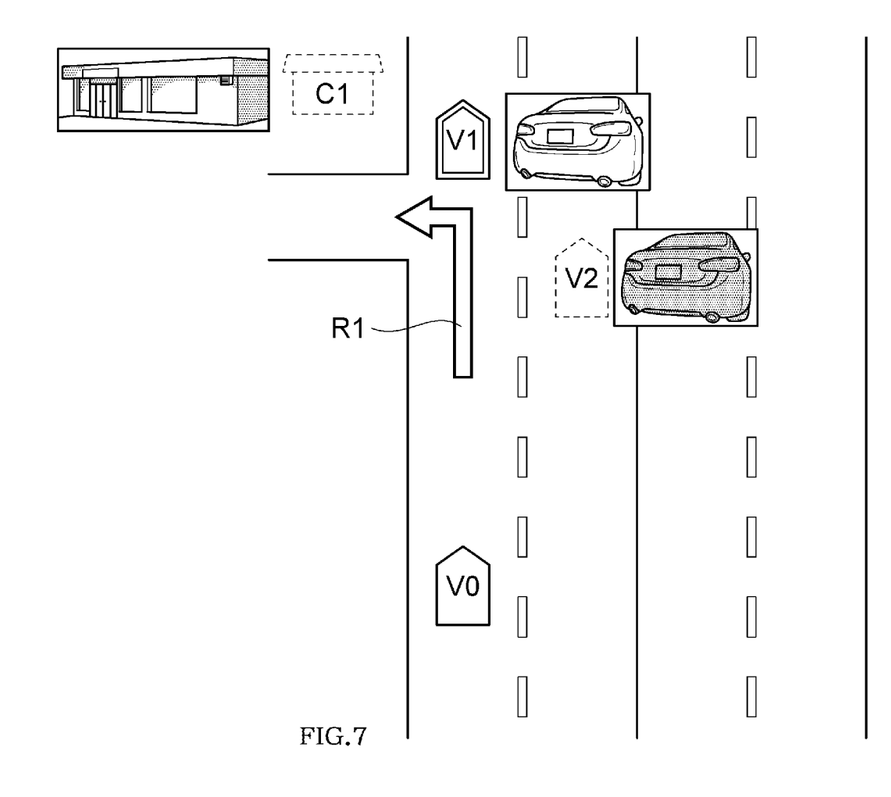
FIG. 7 is a diagram showing another example of image data displayed on the display in the process of FIG. 5.
Figure 8:
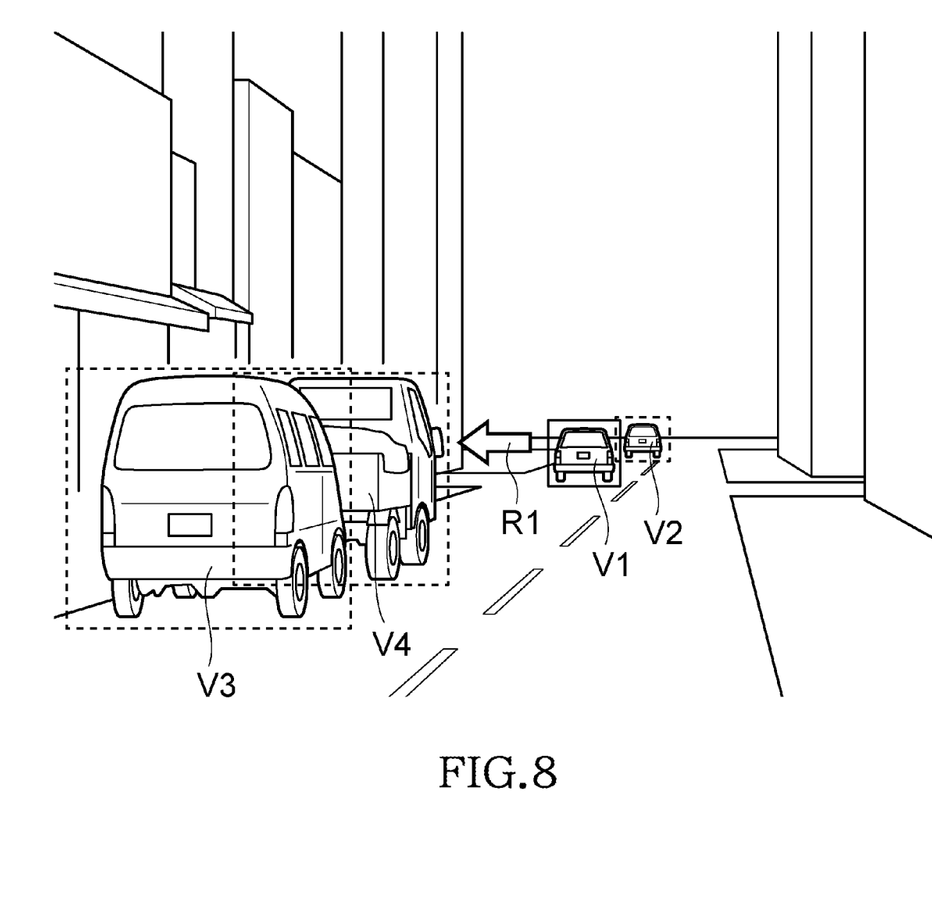
FIG. 8 is a diagram showing another example of image data displayed on the display in the process of FIG. 5.

FIG. 5 is a flow chart showing another more specific process sequence of travel information processing apparatus 1 according to the present embodiment. This process is repeatedly executed at predetermined time intervals, and a destination is inputted to the navigation device of the vehicle and a traveling route to the destination is set as a premise for starting this process. In this case, it may be a manual operation, or it may be an automatic operation for automatically controlling acceleration and deceleration control and/or steering control. First, the voice of the user such as the driver or the passenger is constantly inputted to the in-vehicle sound collecting microphone 11 prior to steps S11 to S13, and the voice recognition unit 12 constantly executes the process of recognition of voice data. Travel information processing apparatus 1 of the present embodiment is an example of a display of a portable terminal or a navigational device presenting to a user or obtaining an answer through image data. FIGS. 6-8 illustrate examples of image data displayed on a display.

The process in steps S31 to S37 is the same as the process in steps S11 to S17 in FIG. 4. That is, in steps S31 to S33, it is determined whether there is language indicating an action (travel control) in the language (character string data) recognized by the voice recognition unit 12 shown in FIG. 2 (step S31), whether there is language indicating a positional relationship of the object (step S32), and whether there is language indicating objects (step S33), respectively. When there is any of language indicating an action, language indicating a positional relationship of an object, and language indicating an object, the process proceeds to step S34, and estimation of the object intended by the user is started. On the other hand, when there isn't any of language indicating an action, language indicating a positional relationship of an object, and language indicating an object, the process returns to step S31. Note that step S31 may be omitted and only steps S32 and S33 may be employed.

In parallel with the process of steps S31 to S33, in step S34, the object recognizing unit 16 constantly recognizes objects around the subject vehicle based on image data, the distance, and the position by using the vehicle exterior imaging camera 13, the onboard sensor 14, and the map database 15. In step S35, it is determined whether there is language indicating details of an object (a modifier of the object of FIG. 2) in the language recognized by the voice recognition unit 12. If there is language indicating details of an object in step S35, the process proceeds to step S36, and the detailed information of each object recognized in step S34 is estimated. If there is no language indicating details of an object does not exist in step S35, the process proceeds to step S37 without estimating the detailed information. The object recognized in step S34 or S36 is an object existing around the subject vehicle and is a candidate of an object intended by the user.

In step S37, the indicated object estimation unit 17 compares the language indicating the action recognized in steps S31 to S33, the language indicating the positional relationship of the object, and the language indicating the object, that is, the object intended by the user through the voice, with the object recognized in steps S34 to S36, and determines whether or not they are coincident. In this case, a predetermined threshold value is set in the degree of coincidence, and similar objects may be included. This is because red colors of "red cars" have different lightness values. In step S37, if there is an object coincident with the object recognized by the voice recognition unit 12 in the objects recognized by the object recognition unit 16, the process proceeds to step S38, and if there is no coincident object, the process proceeds to step S42.

In step S37, when there is an object coincident with the object recognized by the voice recognition unit 12 in the objects recognized by the object recognition unit 16, the process proceeds to step S38. In step S38, the object feature estimation unit 18 creates image data of the estimated object and presents it to the user through the display in order to have the user confirm whether the position and the action of the estimated object are correct. FIG. 6 is a diagram illustrating an exemplary image data created by the object feature estimation unit 18 and displayed on the display. For example, an example is shown in which the user says "turn left on the road in front of the vehicle traveling ahead". It illustrates the subject vehicle V0, the vehicles V1 and V2 traveling ahead, the steering operation information R1 relating to steering operation of the subject vehicle extracted from the language (character string data) indicating the action (travel control), and the convenience store C1 located at the corner of the road. The object recognized by the object recognition unit 16 with respect to the voice data "turn left on the road in front of the vehicle traveling ahead" of the user is the vehicle V1 and the steering operation information recognized from the language indicating the action is the arrow R1 indicating the left turn, and so these are indicated by a solid line, and the other vehicles V2 and the convenience store C1 in the corner are indicated by a dotted line.

FIG. 7 is a diagram showing another exemplary image data created by the object feature estimation unit 18 and displayed on the display. In image data shown in FIG. 6, image data of the vehicles V1 and V2 may be added, or image data of the corner convenience store C1 may be added. FIG. 8 is a diagram illustrating further another exemplary image data created by the object feature estimation unit 18 and displayed on the display. FIG. 8 is image data captured by the vehicle exterior imaging camera 13 to be displayed as it is for the utterance of the user "turn left in front of the taxi" and a solid line surrounding the taxi V1 which is an estimated object, the arrow display R1 representing the left turn, and dotted lines surrounding the other recognized vehicles V2, V3, V4 are overlapped with this image data.

The content presented by the object feature estimation unit 18 is detailed information that differs from the explanation of the object specified by the user through voice, for example, objects V2 and C1 other than the object V1 estimated as shown in FIG. 6, or a color, a size, a vehicle type, a vehicle category, written characters and the like of the estimated object V1 displayed as image data. The content should not be same as an explanation of the user but should be beyond it.

In step S39, the user answers whether or not the presented estimated object is the object intended by the user via the route change identification unit 19. Specifically, when the estimated object displayed on the display is correct, the user presses the "Yes" touch button or touches the displayed estimated object itself. In step S39, if the estimated object is the object intended by the user, the process proceeds to step S40, and the route change identification unit 19 changes a traveling route set preliminarily to a traveling route based on an action intended by the user (travel control) in step S40. For example, when the user utters "turn left the road in front of the taxi", the traveling route is changed to the traveling route for tuning left the road in front of the estimated taxi, although the preliminarily set traveling route is straight ahead.

In step S39, if the estimated object is not an object intended by the user, the process proceeds to step S41, and the route change identifying unit 19 determines whether or not the user has selected another object displayed on the display. For example, if the object estimated in FIG. 8 is the vehicle V2 rather than the vehicle V1, and the user touches the vehicle V2 and selects, it is determined that the vehicle V2 is the vehicle (taxi) intended by the user and the process returns to step S38, and image data of the vehicle V2 surrounded by a solid line is recreated and displayed on the display.

In step S41, when the user does not select a different vehicle, the process proceeds to step S42, where the video when the user starts speaking as shown in FIG. 6 is displayed on the display, and the route change identification unit 19 requests the user to re-explain or explain additionally such as "please explain again" through the display or the speaker. The user can re-explain or explain additionally to this, for example, by touching an object on image data.

In step S43, at the time of re-explanation or additional explanation by the user in step S42, there is a possibility that the user has passed through the intended point, and so it is determined whether or not it is necessary to U-turn the subject vehicle in order to change the route, and if it is not necessary to U-turn, the process proceeds to step S40, and traveling route is changed. If it is necessary to U-turn, the process proceed to step 44 to search for and set a traveling route for returning to the same point, and then traveling route is changed to traveling route intended by the user.

As described above, according to the travel information processing apparatus 1 and the methods of the present embodiment, since an object estimated from voice data is specified based on a word indicating an object around the traveling route and a word indicating a positional relation of objects extracted from user's voice data, and image data or voice data indicating the specified object is output, the user can confirm consistency or accuracy with the object intended by the user by viewing the output image data or listening to the output voice data. As a result, it is possible to provide a travel information processing apparatus and a process in which the user can intuitively and easily instruct the vehicle to perform certain driving operations.

Further, according to the travel information processing apparatus 1 and the method of the present embodiment, since the user's confirmation data is inputted to image data or voice data output from an output device, and traveling route of the vehicle is changed based on the user's confirmation data, it is possible to ensure coincidence or accuracy between the estimated object and the object intended by the user.

Further, according to the travel information processing apparatus 1 and the method of the present embodiment, since image data or voice data having information different from a word indicating an object around the traveling route extracted from voice data or more detailed information is output, the user can confirm the identification of the object with characteristics different from his/her own explanation, and can perform identification of the object more accurately instead of a parrot-like repetition.

Further, according to the travel information processing apparatus 1 and the method of the present embodiment, since steering operation information about steering operation of the vehicle is output based on a word about steering operation of the vehicle extracted from voice data together with image data or voice data, not only a position information of the object but also travel control such as motion of the vehicle, that is, the right/left turn or parking/stopping can be identified as information intended by the user.

Further, according to the travel information processing apparatus 1 and the method of the present embodiment, since image data including road information around the subject vehicle and an icon indicating the steering operation, the icon being superimposed on the road information, in addition to the specified object, it is possible to indicate a next action (travel control) of the subject vehicle by the easily visible icon, and it is possible to confirm what action is to be performed next more intuitively.

Further, according to the travel information processing apparatus 1 and the method of the present embodiment, since an object estimated from voice data is specified based on a map data and information output from an onboard sensor, it is possible to recognize a positional relation with the subject vehicle while sharing the same situation as the user's visual field. For example, it is possible to identify an object intended by the user based on a positional relationship with the subject vehicle, such as the same lane or an adjacent lane, or any object actually visible. Also, by using a map data, it is possible to describe the object intended by the user by adding an attribute to it. For example, while the user uttered "the corner store", more detailed information such as "it is the corner of the cake shop, isn't it?" can be used for identification.

Further, according to the travel information processing apparatus 1 and the method of the present embodiment, since image data is generated by using image data output from the imaging device, it is easy to confirm the object with the user.

Further, according to the travel information processing apparatus 1 and the method of the present embodiment, since image data is generated by using the map data, it is easy to confirm the object with the user.

Further, according to the travel information processing apparatus 1 and the method of the present embodiment, since outputting image data that marks the position of the specified object with respect to road information around the subject vehicle, the positional relationship between the subject vehicle and the identified object is easily visually recognized, the object confirmation with the user is simplified.

The in-vehicle sound collection microphone 11 corresponds to the voice input device according to the present invention. The speech recognition unit 12, the object recognition unit 16, the indicated object estimation unit 17, and the object feature estimation unit 18 correspond to output device according to the present invention. The route change identification unit 19 corresponds to the travel information process unit and the confirmation data input unit according to the present invention. The vehicle exterior imaging camera 13 corresponds to the imaging device according to the present invention. The onboard sensor 14 corresponds to the onboard sensor according to the present invention. The map database 15 corresponds to the storage unit according to the present invention.

DESCRIPTION OF REFERENCE NUMERALS

1 . . . Travel information processing apparatus
11 . . . In-vehicle sound collecting microphone
12 . . . Voice recognition unit
13 . . . Vehicle exterior imaging camera
14 . . . Onboard sensor
15 . . . Map database
16 . . . Object recognition unit
17 . . . Indicated object estimation unit
18 . . . Object feature estimation unit
19 . . . Route change identification unit

The invention claimed is:

1. A travel information processing apparatus comprising:
a voice input device configured to input voice data of a user;
an output device configured to:
specify an object by estimating from the voice data based on a word extracted from the voice data and indicating the object as a target for changing a traveling motion of a subject vehicle around a traveling route, a word extracted from the voice data and indicating a positional relationship of the object and a word extracted from the voice data and related to a traveling command to the subject vehicle; and
output image data or voice data indicating a specified object and explaining a position and a traveling motion for changing the traveling motion of the subject vehicle by using information different from or more detailed than the word extracted from the voice data, indicating the object around the traveling route and relating to at least one of a shape, a size, written characters, a position, and a brand of the object; and
a travel information processor configured to change a traveling motion of a subject vehicle based on the specified object.

2. The travel information processing apparatus according to claim 1, wherein
the voice data includes a word related to a traveling command to the subject vehicle, and
the travel information processor specifies the position and the traveling motion for changing the traveling motion of the subject vehicle based on the specified object and the traveling command, and changes the traveling motion of the subject vehicle.

3. The travel information processing apparatus according to claim 1, further comprising:
a confirmation data input device configured to input confirmation data of the user to the image data or the voice data,
wherein the travel information processor changes the traveling motion of the subject vehicle based on the confirmation data.

4. The travel information processing apparatus according to claim 1,
wherein the output device outputs steering operation information related to a steering operation of a vehicle based on a word related to the steering operation extracted from the voice data together with the image data and the voice data.

5. The travel information processing apparatus according to claim 4, wherein the output device outputs image data including road information around the subject vehicle and an icon indicating the steering operation, the icon being superimposed on the road information.

6. The travel information processing apparatus according to claim 1, further comprising a memory stored with map data and an onboard sensor,
wherein the output device specifies the object by estimating from the voice data based on information output from the map data and the onboard sensor.

7. The travel information processing apparatus according to claim 6, further comprising an imaging device configured to capture an image around the subject vehicle, wherein the image data is generated by using image data from the imaging device.

8. The travel information processing apparatus according to claim 6, wherein the image data is generated by using the map data.

9. The travel information processing apparatus according to claim 1, wherein the output device outputs image data marking a position of the specified object with respect to road information around the vehicle.

10. A travel information processing method using a computer operated by a program, the method comprising:
- inputting voice data of a user;
- specifying an object by estimating from the voice data based on a word extracted from the voice data and indicating the object as a target for changing a traveling motion of a subject vehicle around a traveling route, a word extracted from the voice data and indicating a positional relationship of the object and a word extracted from the voice data and related to a traveling command to the subject vehicle;
- output image data or voice data indicating a specified object and explaining a position and a traveling motion for changing the traveling motion of the subject vehicle by using information different from or more detailed than the word extracted from the voice data, indicating the object around the traveling route and relating to at least one of a shape, a size, written characters, a position, and a brand of the object; and
- changing a traveling motion of a subject vehicle based on the specified object.

\* \* \* \* \*